United States Patent [19]

Brown et al.

[11] Patent Number: 4,684,608
[45] Date of Patent: Aug. 4, 1987

[54] LATEX COMPOSITIONS COMPRISING LOADABLE POLYMERIC PARTICLES

[75] Inventors: James W. Brown, Spencerport; Tsang J. Chen, Rochester, both of N.Y.; Michael A. Schen, Amherst, Mass.

[73] Assignee: Eastman Kodak Company, Rochester, N.Y.

[21] Appl. No.: 800,197

[22] Filed: Nov. 21, 1985

Related U.S. Application Data

[62] Division of Ser. No. 660,157, Oct. 12, 1984, Pat. No. 4,608,424, which is a division of Ser. No. 399,404, Jul. 19, 1982, Pat. No. 4,497,929.

[51] Int. Cl.$^4$ .............................. G03C 1/02
[52] U.S. Cl. ...................... 430/629; 430/222; 430/449; 430/512; 430/517; 430/566; 430/630; 430/631
[58] Field of Search ............... 430/222, 449, 512, 517, 430/566, 630, 631, 629

[56] References Cited

U.S. PATENT DOCUMENTS

| | | | |
|---|---|---|---|
| 2,476,027 | 7/1949 | Clifford | 526/270 |
| 3,265,768 | 8/1966 | Mottus et al. | 526/270 |
| 3,311,597 | 3/1967 | Mottus | 526/270 |
| 3,321,405 | 5/1967 | Mottus et al. | 252/51.5 |
| 3,634,373 | 1/1972 | Stapleton | 260/86.1 |
| 4,087,574 | 5/1978 | Yamaguchi et al. | 427/47.4 |
| 4,091,052 | 5/1978 | Horii et al. | 260/30.4 |
| 4,199,363 | 4/1980 | Chen | 430/512 |
| 4,203,716 | 5/1980 | Chen | 430/207 |
| 4,214,047 | 7/1980 | Chen | 430/448 |
| 4,448,850 | 5/1984 | Upson et al. | 428/510 |

FOREIGN PATENT DOCUMENTS

0017717 2/1980 European Pat. Off. .
8400621 2/1984 United Kingdom ............... 526/270

OTHER PUBLICATIONS

Research Disclosure Statement, Dec. 1978, Tsang J. Chem.

*Primary Examiner*—Joseph L. Schofer
*Assistant Examiner*—J. M. Reddick
*Attorney, Agent, or Firm*—John R. Everett

[57] ABSTRACT

A latex composition having utility in articles such as photographic elements is disclosed. The composition comprises loadable polymer particles having recurring units a, b and c wherein:

component a is 10 to 100 weight percent of a tetrahydrofurfuryl monomer having the structure:

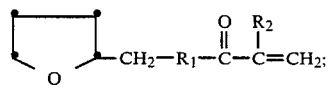

in which
$R_1$ represents O or NH; and
$R_2$ represents H or lower alkyl of about 1 to 6 carbon atoms;
component b is 0 to 20 weight percent of a hydrophilic monomer and
component c is 0 to 90 weight percent of a hydrophobic monomer.

6 Claims, No Drawings

LATEX COMPOSITIONS COMPRISING LOADABLE POLYMERIC PARTICLES

This is a division of application Ser. No. 660,157, filed Oct. 12, 1984, now U.S. Pat. No. 4,608,424, which is a divisional of Ser. No. 399,404, filed July 19, 1982, now U.S. Pat. No. 4,497,929.

FIELD OF THE INVENTION

This invention relates to novel polymers and latexes comprising same; to elements containing such polymers and to a method of making the compositions.

BACKGROUND OF THE INVENTION

Latex compositions in which the polymer particles are loaded with a useful material which is normally water-insoluble (a hydrophobe) are known from U.S. Pat. Nos. 4,199,363; 4,203,716 and 4,214,047 all in the name of T. J. Chen. In such compositions the polymer is "loaded" with the hydrophobe in that the hydrophobe is dispersed in or dissolved in the polymer particles. Latex compositions comprising loaded polymer particles have resulted in improved coating compositions and coated layers for many applications.

There is, however, a continuing need for latex coating compositions with improved compatibility with hydrophobic photographic addenda. In many latex coating compositions containing hydrophobes such as optical brighteners and yellow filter dyes, the hydrophobes crystallize out of the latex rapidly limiting the use of such compositions in photographic elements.

SUMMARY OF THE INVENTION

The present invention provides stable latex compositions comprising a polymer capable of being loaded with hydrophobes (loadable) such as yellow filter dyes and optical brighteners used in the layers of photographic elements. Coated layers of latex compositions comprising polymer particles loaded with such hydrophobes are clear and homogeneous. The hydrophobe in the coatings exhibits no adverse sensitometric effect on photographic emulsions and has less tendency to crystallize.

The latex compositions of the invention comprise "an aqueous" continuous phase having dispersed therein at least 0.5 weight percent polymer particles characterized in that the polymer is loadable and has recurring units derived from components a, b and c wherein component a is 10 to 100 weight percent of a tetrahydrofurfuryl monomer having the structure:

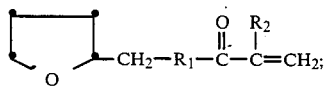

in which
$R_1$ represents O or NH; and
$R_2$ represents H or lower alkyl of about 1 to 6 carbon atoms such as methyl, hexyl and propyl;
component b is 0 to 20 weight percent of a hydrophilic monomer and
component c is 0 to 90 weight percent of a hydrophobic monomer.

The term "loadable" refers to the ability of the polymer to pass the "Loadable Polymer Particle Test" described hereinafter. Loadable polymers wherein component a is 10 to 98 weight percent; component b is 2 to 20 weight percent and component c is 0 to 88 weight percent are believed to be novel.

The latex compositions of the invention are prepared by:
1. dissolving a polymerization initiator and an emulsifying agent in water
2. mixing
   a. 10 to 100 weight percent of a tetrahydrofurfuryl monomer having the structure:

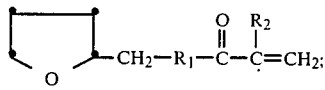

in which
$R_1$ represents O or NH; and
$R_2$ represents H or lower alkyl of about 1 to 6 carbon atoms;
   b. 0 to 20 weight percent of a hydrophilic monomer and
   c. 0 to 90 weight percent of a hydrophobic monomer.
neutralizing the mixture and
adding the mixture slowly to the solution 1 at a temperature above 80° C. thereby forming the loadable latex composition.

Preferred polymers have the above structure wherein component a is from 30 to 70 weight percent; component b is from 2 to 10 weight percent and component c is from 10 to 50 weight percent.

DETAILED EMBODIMENTS OF THE INVENTION

The polymers of the invention are conveniently prepared in a latex by known emulsion polymerization techniques. Such techniques and requisite materials such as initiators, emulsifiers, etc., are disclosed in numerous references such as W. R. Sorenson and T. W. Campbell, "Preparative Methods of Polymer Chemistry", 2nd Ed., NY, NY, Wiley (1968) and M. P. Stevens, "Polymer Chemistry-An Introduction", Addison Wesley Publishing Co., Reading, Mass. (1975).

Generally, the polymers are prepared by dissolving a polymerization initiator and an emulsifying agent in water. The monomers are mixed in approximately the weight ratio desired in the final polymer. Any acid monomer is neutralized if necessary. The mixture is added slowly to the solution of the initiator and emulsifying agent at a temperature above about 90° C. The polymerization is allowed to proceed until the reaction is completed. The resulting latex composition, comprising a polymer of this invention, is used to prepare the useful loaded latex compositions of the invention comprising the polymer.

The monomers useful in forming the hydrophobic portion of the polymer (component c) include vinylidene chloride, styrene, vinyl chloride, vinyl acetate, acrylates and methacrylates.

Examples of acrylates include methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, phenyl acrylate, and the like.

Examples of methacrylates include methyl methacrylate, ethyl methacrylate, propyl methacrylate, isopropyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, N-ethyl-N-phenylaminoethyl methacrylate, 2-methoxyethyl methacrylate, 2-(3-phenylpropyloxy)ethyl methacrylate, dimethylaminophenoxyethyl methacrylate, furfuryl methacrylate, phenyl methacrylate, cresyl methacrylate, naphthyl methacrylate, and the like.

Examples of monomers which provide the hydrophilic portion of the polymer (component b) include those monomers having groups such as carboxyl, sulfonate, hydroxy and other polar groups.

Examples of hydroxy-containing monomers include hydroxyethyl acrylate, hydroxyethyl methacrylate, hydroxypropyl methacrylate, hydroxypropyl acrylate, 3-chloro-2-hydroxypropyl acrylate, 3-chloro-2-hydroxypropyl methacrylate, 2,2-dimethylhydroxypropyl acrylate, 5-hydroxypentyl acrylate, diethylene glycol monoacrylate trimethylolpropane monoacrylate, pentaerythritol monoacrylate, 2,2-dimethyl-3-hydroxypropyl acrylate, 5-hydroxypentyl methacrylate, diethylene glycol monomethacrylate, trimethylolpropane monomethacrylate, pentaerythritol monomethacrylate, N-methylolacrylamide, N-methylolmethacrylamide, N-ethyl-N-methylolmethacrylamide, N-ethyl-N-methylolacrylamide, N,N-dimethylolacrylamide, N-ethanolacrylamide, N-propanolacrylamide, N-methylolacrylamide and other similar groups. Monomers that generate one or more alcohol groups during emulsion polymerization, such as glycidyl acrylate and glycidyl methacrylate may also be useful.

Examples of sulfonate-containing monomers include sodium 2-acrylamido-2-methylpropanesulfonate, sodium vinylsulfonate and sodium styrenesulfonate.

Examples of carboxyl group containing monomers include acrylic acid, methacrylic acid and itaconic acid.

The hydrophobic portion of the polymer, if present, is in sufficient amounts to ensure desired glass transition temperature, clarity and water-insolubility of the latex particles.

The hydrophilic portion of the polymer, if present, is in sufficient amounts to ensure solvent, gelatin and salt compatibility and emulsion stability.

The tetrahydrofurfuryl monomers provide improved compatability and stability to the loaded polymer compositions.

The foregoing emulsification polymerization technique was used to prepare latex compositions comprising the loadable polymers of the invention. Representative polymers prepared according to the emulsification technique are presented in Table I.

TABLE I

| Polymer | Monomer Weight Ratio |
|---|---|
| 1. Poly(n-butyl acrylate-co-tetrahydrofurfuryl methacrylate-co-sodium 2-acrylamido-2-methylpropanesulfonate) | 65/25/10 |
| 2. Poly(n-butyl acrylate-co-tetrahydrofurfuryl methacrylate-co-sodium 2-acrylamido-2-methylpropanesulfonate) | 50/40/5 |
| 3. Poly(n-butyl acrylate-co-tetrahydrofurfuryl methacrylate-co-sodium 2-acrylamido-2-methylpropanesulfonate) | 30/65/5 |
| 4. Poly(methyl acrylate-co-tetrahydrofurfuryl methacrylate-co-sodium 2-acrylamido-2-methylpropanesulfonate) | 30/65/5 |
| 5. Poly(methyl acrylate-co-tetrahydrofurfuryl methacrylate-co-sodium 2-acrylamido-2-methylpropanesulfonate) | 55/40/5 |
| 6. Poly(methyl acrylate-co-tetrahydrofurfuryl methacrylate-co-sodium 2-acrylamido-2-methylpropanesulfonate) | 75/20/5 |
| 7. Poly(tetrahydrofurfuryl methacrylate-co-sodium 2-acrylamido-2-methylpropanesulfonate) | 95/5 |

The loaded polymer latex compositions of this invention consist of an aqueous continuous phase and a dispersed or discontinuous polymer phase in which one or more hydrophobic compounds is dispersed and/or dissolved in the particles.

The process of loading (dispersing, dissolving or associating) a hydrophobic compound within loadable polymer particles is accomplished in the following manner, as described in U.S. Pat. No. 4,214,047.

The hydrophobic compound (or hydrophobe) to be loaded is dissolved in a water-miscible organic solvent, and an aqueous latex consisting essentially of water as a continuous phase and loadable polymer particles as a dispersed phase is then blended into the water-miscible organic solvent containing the hydrophobe. Blending is undertaken so that the hydrophobe remains in solution and the loadable polymer particles remain dispersed. That is, separation of the hydrophobe or coagulation of the polymer particles is avoided.

By avoiding separation or coagulation of the hydrophobe or the polymer particles, a two-phase mixture is established in which in the continuous phase the mixture of water-miscible organic solvent and water constitutes one phase and the polymer particles constitute a second phase. Initially, the hydrophobe is within the water-miscible organic solvent. In the two phase mixture resulting from blending, the hydrophobe is brought into intimate association with both the continuous and the dispersed phases. The hydrophobe is then free to distribute itself between these phases based on its relative solubilities therein. Dilution of the water-miscible organic solvent with water has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles become loaded with hydrophobe. This loading procedure requires that the hydrophobe remain dissolved until associated with the polymer particle.

In most instances all the water desired to dilute the water-miscible organic solvent and shift the equilibrium distribution of the hydrophobe is present in the aqueous latex during initial blending. Where it is desired to introduce additional water, as where a concentrated latex is employed, additional water is blended with the loaded latex composition resulting from the initial step of blending. The additional water has the effect of further reducing the affinity of the hydrophobe for the continuous phase. This further drives or shifts the equilibrium distribution of the hydrophobe away from the continuous phase toward the dispersed phase and further contributes to loading the polymer particles with hydrophobe.

While blending of water and loadable polymer particles with the water-miscible organic solvent containing hydrophobe dissolved therein results in significant loading of the hydrophobe into the polymer particles, a substantial portion of the hydrophobe remains in the continuous phase dissolved in the water-miscible organic solvent. Further loading of the hydrophobe into the polymer particles can be achieved by removing water-miscible organic solvent from the continuous phase. This has the effect of further increasing the affinity of the hydrophobe for the dispersed phase. It is preferred to remove at least a major portion—in other words, at least about half—of the water-miscible organic solvent. This drives or shifts the equilibrium distribution of the hydrophobe away from the continuous phase toward the dispersed phase. A still higher proportion of hydrophobe becomes dissolved or dispersed in the polymer particles so that their loading is further increased.

It is unnecessary to practice all of the loading steps indicated above following initial blending and loading. For certain applications the loaded latex composition resulting from initial blending and loading is used directly, or the loaded polymer particles are separated from the continuous phase and used directly.

The water-miscible organic solvents useful in the practice of this loading process are those which:
a. can be dissolved in (i.e., are "miscible" with) distilled water at 20° C. to the extent of at least about 20 parts by volume of solvent in 80 parts by volume of water;
b. have boiling points (at atmospheric pressure) above about $-10°$ C.;
c. do not detrimentally react chemically with aqueous latexes containing the loadable polymer particles which are useful in the practice of this process; and
d. do not dissolve more than about 5 weight percent of such loadable polymer particles in the aqueous latex at 20° C.

Regarding requirement (c) for useful solvents, reaction between the solvent and polymer is possible under certain circumstances, but is believed to be unlikely. Typical non-limiting examples of such useful water-miscible organic solvents are water-miscible alcohols, ketones and amides (e.g. acetone, ethyl alcohol, methyl alcohol, isopropyl alcohol, dimethylformamide, methyl ethyl ketone), tetrahydrofuran, N-methyl-2-pyrrolidone, dimethyl sulfoxide and mixtures thereof. Of these, acetone, dimethylformamide and/or tetrahydrofuran are preferred when the hydrophobic material is soluble therein.

The loadable polymer particles which are useful in the practice of this process are chosen from the polymers which meet the Loadable Polymer Particle Test.

Loadable Polymer Particle Test

At 25° C., the loadable polymer particles being tested must (a) be capable of forming a latex with water at a polymer particle concentration of from 10 to 20 percent by weight, based on total weight of the latex, and (b) when 100 ml of the latex is then mixed with an equal volume of the water-miscible organic solvent to be employed in forming the loaded polymeric latex composition desired, stirred and allowed to stand for 10 minutes, exhibit no observable coagulation of the polymer particles.

The latex is characterized in that the loadable polymer particles are generally highly dispersed as compared to coupler solvent and similar hydrophobic particle dispersions in hydrophilic colloid coatings. The loadable polymer particles exhibit an average diameter in the range of from 0.02 to 0.2 micron, preferably in the range of from about 0.02 to 0.08 micron. Although some swelling can occur during loading, the loaded polymer particles also preferably fall within these same ranges of average diameters. The loadable polymer particles form at least 2 percent by weight of the aqueous latex and preferably form at least 10 percent by weight thereof. Preferably the aqueous latex contains about 20 percent by weight or less of the loadable polymer particles.

To be considered a hydrophobic compound as that term is employed herein the compound must be essentially insoluble in distilled water at 25° C. Preferably the dissolved concentration of hydrophobe in water under these conditions should be less than 0.5 percent by weight, based on the weight of the water. Any such hydrophobe is employed in the practice of this process which can be dissolved in a liquid consisting of one or a mixture of water-miscible organic solvents. Preferably the hydrophobe must be soluble in a concentration of at least 5 percent by weight, based on the total weight of the water-miscible organic solvent and dissolved hydrophobe. In practice minor amounts of essentially diluent materials, such as minor amounts of water commonly entrained in water-miscible solvents, are associated with the blended hydrophobe and water-miscible organic solvent; however, the hydrophobe and water-miscible organic solvent or solvents are chosen so that additional materials, such as pH or other modifiers—e.g. acid or alkali—are not required to dissolve the hydrophobe.

Specifically preferred hydrophobic photographic addenda of this type include those used to perform coupling, silver halide development, oxidized developer scavenging, spectral sensitizing or desensitizing, diffusion transfer dye image-forming, conducting and visible or ultraviolet light absorbing functions when incorporated in a silver halide photographic element. Other hydrophobic photographic addenda encompass those used in silver halide photographic elements as brighteners, antioxidants, silver halide solvents, bleachable dyes in silver-dye-bleach imaging processes and the like. All those hydrophobic photographic addenda which have been conventionally introduced into hydrophilic colloid layers of photographic elements in coupler-solvent and similar high boiling organic solvent droplets are ideally suited for use in the practice of this invention.

In terms of end photographic uses, all of the hydrophobic photographic addenda useful as hydrophobes in the practice of this process can be introduced in their conventional concentrations and locations within photographic materials and elements. Such photographic materials and elements are well known to chemists skilled in the photographic arts and need not be discussed in detail herein. Photographic materials in the preparation of which the process of the present invention is especially useful include, for example, image transfer materials, physical development materials, radiographic materials, dry development systems, color-forming materials, and the like, such as are described in *Product Licensing Index*, Vol. 92, Dec. 1971, pages 107–110, and in British Pat. No. 923,045.

Examples of some of the photographically useful loaded latex compositions of the present invention include compositions which comprise a loadable polymer, as described herein loaded with one or more hydrophobic materials, as described above. Generally the amount of hydrophobe which is present in intimate association with the polymer particles of the latex is anywhere within the range of from 1:40 to 3:1 in terms of a weight ratio of hydrophobe to loadable polymer. It is preferred that the weight ratio of hydrophobe to loadable polymer in the latex be from about 1:10 to 2:1, optimally from about 1:3 to 1:1.

Generally the proportion of aqueous latex added to the water-miscible organic solvent containing hydrophobe is maintained in the volume ratio of 1:4 to 4:1, preferably 1:2 to 2:1. Not all of the water added, however, need be present in the aqueous latex. It is contemplated that a portion of the water which might be blended in the aqueous latex is added subsequent to blending the aqueous latex and water-miscible organic solvent.

Useful coated layers can be formed from both the loadable and the loaded polymer latex composition of the invention. The layers are coated by preparing a latex composition comprising a loadable polymer or a polymer loaded with a hydrophobe.

Where it is desired to coat hydrophilic colloid layers, as in photographic applications and elements, the polymer particles, loadable or loaded, are chosen to be readily dispersible in a hydrophilic colloid composition, such as an aqueous gelatin solution. This is accomplished by employing particles consisting essentially of a loadable polymer of the type defined herein. This allows the hydrophilic colloid composition to be uniformly blended with the loadable or loaded latex composition. The resulting hydrophilic colloid containing latex composition is then coated onto a suitable substrate, such as a conventional photographic support. Water and, if any is present, water-miscible organic solvent are then removed from the coating so that a solid hydrophilic colloid coating results. Depending upon the specific photographic application, the hydrophilic coating containing the polymer particles is the sole coating on the support, an undercoat, interlayer or overcoat. In one useful embodiment the polymer particles are incorporated in a gelatino-silver halide emulsion layer of a photographic element.

The loaded latex compositions, with or without a hydrophilic colloid, are coated onto a useful substrate, such as a conventional photographic support, using conventional techniques. It is specifically contemplated to coat the latex compositions of the invention using coating hoppers and other apparatus conventionally employed in the photographic arts for forming single or multiple coatings on photographic supports. Useful coating techniques and supports are described in the *Product Licensing Index*, Vol. 92, pages 107–110, December, 1971, and the publications referred to therein.

Although these preferred embodiments are useful in photographic elements, the present invention is not limited to photographic materials and processes, but is useful wherever it is deemed desirable to obtain a distribution of a hydrophobe through a polymeric material. Although the distribution of hydrophobe through polymeric material is generally used ultimately in a layer on a support, other end uses are contemplated. For example, useful hydrophobes include insecticides, herbicides, paint pigments, minerals, hormones, vitamins, enzymes and the like. It will be understood that the end use of such polymer latex compositions involve supports of all kinds, or in many applications no support at all.

The following examples are presented to further illustrate the invention:

EXAMPLE 1

Preparation of Latex Containing Polymer 1 of Table I

A reactor at 85° C. under a nitrogen atmosphere was charged with 13.3 kg of water, 125 g of Triton 770 surfactant (30%) available from Rohm & Haas, 100 g of $K_2S_2O_8$ and 30 g of $Na_2S_2O_5$. A well-homogenized monomer mixture, consisting of 3 kg of n-butyl acrylate, 6.5 kg of tetrahydrofurfuryl methacrylate, 500 g of 2-acrylamido-2-methylpropanesulfonic acid neutralized with 100 g of NaOH in 10 kg of water, 125 g of Triton 770 surfactant (30%) and 50 g of $K_2S_2O_8$, was added with constant stirring to the reactor over a period of 45 minutes. The polymerization was allowed to proceed for an additional 3 hours. The resulting latex was cooled to room temperature and dialyzed against flowing distilled water overnight. The weight percent of polymer in the latex was 22%.

EXAMPLE 2

Preparation of Latex Loaded with an Optical Brightener

A 22 liter flask immersed in a water bath at 50° C. was charged with 97.5 g of 2,5-bis(6-butyl-2-benzoxazolyl)-thiophene and 5,850 ml of tetrahydrofuran (THF). The mixture was heated to 35° C. The latex (8,945 g) prepared in Example 1, (pH adjusted to 3.5 with 10% NaOH) was poured into the THF solution with moderate agitation. The bath temperature was raised to 80° C. slowly over a period of two hours. THF was removed under an aspirator vacuum at the same time. The dispersion was filtered. Aqueous bone gelatin (1,560 g–25% by wt.) was added to the filtered dispersion. The resulting dispersion was practically free from crystals when observed under an optical microscope.

EXAMPLE 3

Coating of a Loaded Latex Dispersion of Example 2

The dispersion prepared according to Example 2 was coated in a yellow photographic emulsion layer at 2.8 mg/ft$_2$. A reduction in stain level in the non-image areas of 0.011 unit was achieved when compared with control which did not contain the loaded latex. The improvement in whiteness was vivid and visible to the naked eye. After exposure and color processing no adverse sensitometric effect was noted.

EXAMPLE 4

Preparation of Latex Loaded with a Yellow Filter Dye

To 0.99 g of the yellow filter dye 4'-{{2-cyano-3-{4-[N,N-bis(i-propoxycarbonylmethyl) amino]phenyl}a-cryloyl}}ethanesulfonanilide, dissolved in 40 ml acetone was added with agitation 10.5 g of a latex of polymer 4 at 18.8% solids. The acetone was removed under diminished pressure using a rotary evaporator at a water bath temperature of 50° C. The dispersion was filtered. The dyed latex dispersion was added to 29.9 g (12.5% by wt.) of aqueous bone gelatin and adjusted to a final melt weight of 270 g with water. This addition included surfactant, antifoggant and antioxidant. The dispersion was analyzed (0.43% dye) prior to dilution with addenda and gelatin. This melt, had a final composition of 0.33% dye and 1.2% gelatin with a latex/dye ratio of 2. It was coated to give an optical density of 0.93 at a dye laydown of 17.3 mg/ft$_2$. No adverse sensitometric effect was noted.

Photomicrographs (brightfield and polarized light) at 1000× indicated that no crystals, large particles or agglomeratezs were present in the gelatin stabilized loaded latex dispersion.

EXAMPLES 5-9

Five different latices loaded with yellow filter dye were prepared from polymers 2, 3, 5, 6 and 7 of Table I and mixed with bone gelatin as in Example 4. A coating of each dispersion was prepared. The results were similar to those acheived in Example 4.

The invention has been described in detail with particular reference to preferred embodiments thereof, but it will be understood that variations and modifications can be effected within the spirit and scope of the invention.

We claim:

1. An element comprising a support having thereon a layer comprising a polymer loaded with a hydrophobe; wherein the polymer has recurring units derived from components a, b and c; wherein component a is 10 to 100 weight percent of a tetrahydrofurfuryl monomer having the structure:

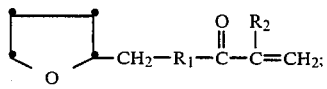

in which

R$_1$ represents O or NH; and

R$_2$ represents H or lower alkyl of about 1 to 6 carbon atoms;

component b is 0 to 20 weight percent of a hydrophilic monomer selected from the group consisting of hydroxyethyl acrylate, hydroxyethyl methacrylate, hydroxypropyl acrylate, hydroxypropyl methacrylate, 3-chloro-2-hydroxypropyl acrylate, 3-chloro-2-hydroxypropyl methacrylate, 2,2-dimethylhydroxypropyl acrylate, 5-hydroxypentyl acrylate, diethylene glycol monoacrylate trimethylolpropane monoacrylate, pentaerythritol monoacrylate, 2,2-dimethyl-3-hydroxypropyl acrylate, 5-hydroxypentyl methacrylate, diethylene glycol monomethacrylate, trimethylolpropane monomethacrylate, pentaerythritol monomethylacrylate, N-methylolmethacrylamide, N-ethyl-N-methylolmethacrylamide, N-ethyl-N-methylolacrylamide, N,N-dimethylolacrylamide, N-ethanolacrylamide, N-propanolacrylamide, N-methylolacrylamide, and sodium 2-acrylamido-2-methylpropane sulfonate and component c is 0 to 90 weight percent of a hydrophobic monomer selected from the group consisting of vinylidene chloride, styrene, vinyl chloride, vinyl acetate, acrylates and methacrylates; and the hydrophobe is selected from substantially water-insoluble, oleophilic photographic addenda.

2. The element of claim 1 wherein component a is from 30 to 70 weight percent;
component b is from 2 to 10 weight percent and
component c is 2 to 10 weight percent.

3. The element of claim 1 wherein the polymer is selected from the group consisting of poly(n-butyl acrylate-co-tetrahydrofurfuryl methacrylate-co-sodium 2-acrylamido-2-methylpropanesulfonate);

poly(methyl acrylate-co-tetrahydrofurfuryl methacrylate-co-sodium 2-acrylamido-2-methylpropanesulfonate) and poly(tetrahydrofurfuryl methacrylate-co-sodium 2-acrylamido-2-methylpropanesulfonate).

4. The element of claims 1, 2 or 3 wherein the hydrophobe is selected from the group consisting of those used to perform coupling, silver halide developing, oxidized developer scavenging, spectral sensitizing or desensitizing, diffusion transfer dye image forming, visible or ultraviolet light absorbing, and optical brightening functions when incorporated in a silver halide photographic element.

5. The element of claims 1, 2 or 3 wherein the hydrophobe is selected from the group consisting of a yellow filter dye and optical brighteners.

6. The element of claims 1, 2 or 3 comprising a silver halide photographic layer.

* * * * *